(12) United States Patent
Murakami et al.

(10) Patent No.: US 6,572,941 B1
(45) Date of Patent: Jun. 3, 2003

(54) GLARE-RESISTANT TOUCH PANEL

(75) Inventors: Yukio Murakami, Kameoka (JP); Shunsuke Hirano, Kameoka (JP)

(73) Assignee: Gunze Limited, Kyoto (JP)

( * ) Notice: Subject to any disclaimer, the term of this patent is extended or adjusted under 35 U.S.C. 154(b) by 0 days.

(21) Appl. No.: 09/574,104

(22) Filed: May 18, 2000

(30) Foreign Application Priority Data

May 19, 1999 (JP) ............................................. 11-138977
Mar. 21, 2000 (JP) ....................................... 2000-079002

(51) Int. Cl.$^7$ ................................................. G09G 5/00
(52) U.S. Cl. ........................ 428/34; 428/192; 428/195; 428/201; 428/212; 428/500; 345/173
(58) Field of Search ........................ 428/34, 212, 195, 428/201, 500, 192; 349/12; 345/173, 174, 175, 176, 177, 178

(56) References Cited

U.S. PATENT DOCUMENTS 4,526,818 A * 7/1985 Hoshikawa et al. ........... 428/1

FOREIGN PATENT DOCUMENTS

| EP | 697646 | 2/1996 |
|----|--------|--------|
| JP | 5050561 | 3/1993 |
| JP | 5127822 | 5/1993 |
| JP | 5173707 | 7/1993 |
| JP | 784705 | 3/1995 |
| JP | 96533 | 1/1997 |
| JP | 1048625 | 2/1998 |

* cited by examiner

Primary Examiner—Paul Thibodeau
Assistant Examiner—Christopher Paulraj

(57) ABSTRACT

A touch panel is constructed of a top sheet member having a resistive membrane on its inner surface and a base sheet member having a resistive membrane on its inner surface, the top and base sheet members facing each other with dot spacers being located in between. The top sheet member is formed by laminating a PET film, a polarizing film, a ¼λ retardation film, and a light isotropic film in this order from its outer surface. The PET film has a thermal expansion coefficient lower than the other films underneath, such as the polarizing film. Accordingly, the PET film serves to keep the other films of the top sheet member from bulging outward when the temperature rises.

14 Claims, 12 Drawing Sheets

FIG. 4

(TABLE 1)

| LAMINATED MATERIAL | THICKNESS $\mu m$ | THERMAL EXPANSION COEFFICIENT $10^{-5} cm/cm/°C$ |
|---|---|---|
| PET FILM | 188 | 1.5 |
| POLARIZING FILM (TAC/PVA/TAC) | 180 | 5.4 |
| 1/4 $\lambda$ RETARDATION FILM (PC) | 80 | 6.2 |
| LIGHT ISOTROPIC FILM (POLYOLEFIN RESIN) | 188 | 6.2 |
| GLASS | 1100 | 0.7 |

FIG. 5

(TABLE 2)

(1) PET FILM ADHERED — GLASS THICKNESS 1100 μm

| ATMOSPHERIC CONDITION | ① IN ATMOSPHERE | | | | | ② AFTER REMOVAL | | | |
|---|---|---|---|---|---|---|---|---|---|
| | AMOUNT OF BULGE (mm) | OPERATING WEIGHT(g) | | | AMOUNT OF BULGE (mm) | OPERATING WEIGHT(g) | | | |
| | | 80 | 100 | 130 | 200 | | 80 | 100 | 130 | 200 |
| 70°C | 0 | ○ | | | | 1 | × | × | △ | ○ |
| 25°C 90% | 0.5 | ○ | | | | 0 | ○ | | | |
| 40°C 90% | 0 | ○ | | | | 0 | ○ | | | |
| 60°C 90% | 0 | ○ | × | △ | | 1 | × | × | △ | |
| −20°C | 1 | × | | | ○ | 0 | ○ | | | ○ |

FIG. 6

(TABLE 3)
(2) PET FILM ADHERED
(WITH STRESS RELIEVING ADHESIVE)                    GLASS THICKNESS 1100 μm

| ATMOSPHERIC CONDITION | ① IN ATMOSPHERE | | | | | ② AFTER REMOVAL | | | | |
|---|---|---|---|---|---|---|---|---|---|---|
| | AMOUNT OF BULGE (mm) | OPERATING WEIGHT (g) | | | | AMOUNT OF BULGE (mm) | OPERATING WEIGHT (g) | | | |
| | | 80 | 100 | 130 | 200 | | 80 | 100 | 130 | 200 |
| 70°C | 0 | ○ | | | | 1 | × | × | △ | ○ |
| 25°C 90% | 0.5 | ○ | | | | 0 | ○ | | | |
| 40°C 90% | 0 | ○ | | | | 0 | ○ | | | |
| 60°C 90% | 0 | ○ | | | | 0 | ○ | | | |
| −20°C | 1 | × | × | △ | ○ | | | | | |

FIG. 8

(TABLE 4)

(1) PET FILM ADHERED    GLASS THICKNESS 700 μm

| ATMOSPHERIC CONDITION | ① IN ATMOSPHERE | | | | | ② AFTER REMOVAL | | | | |
|---|---|---|---|---|---|---|---|---|---|---|
| | AMOUNT OF BULGE (mm) | OPERATING WEIGHT (g) | | | | AMOUNT OF BULGE (mm) | OPERATING WEIGHT (g) | | | |
| | | 80 | 100 | 130 | 200 | | 80 | 100 | 130 | 200 |
| 70°C | 0 | ○ | | | | 1 | × | × | △ | ○ |
| 25°C 90% | 0.5 | ○ | | | | 0 | ○ | | | |
| 40°C 90% | 0 | ○ | | | | 0 | ○ | | | |
| 60°C 90% | 0 | ○ | | | | 1 | × | × | △ | ○ |
| −20°C | 1.5 | × | × | × | × | 0 | ○ | | | |

(TABLE 5)
(2) PET FILM ADHERED
(WITH STRESS RELIEVING ADHESIVE)                    GLASS THICKNESS 700 μm

FIG. 9

| ATMOSPHERIC CONDITION | ① IN ATMOSPHERE | | | | | ② AFTER REMOVAL | | | | |
|---|---|---|---|---|---|---|---|---|---|---|
| | AMOUNT OF BULGE (mm) | OPERATING WEIGHT(g) | | | | AMOUNT OF BULGE (mm) | OPERATING WEIGHT(g) | | | |
| | | 80 | 100 | 130 | 200 | | 80 | 100 | 130 | 200 |
| 70°C | 0 | ○ | | | | 1 | × | | | |
| 25°C 90% | 0.5 | ○ | | | | 0 | ○ | | | |
| 40°C 90% | 0 | ○ | | | | 0 | ○ | | | |
| 60°C 90% | 0 | ○ | | | | 0 | ○ | | | |
| −20°C | 1.5 | × | × | × | × | | | × | △ | ○ |

GLARE-RESISTANT TOUCH PANEL

BACKGROUND OF THE INVENTION

1. Field of the Invention

The present invention relates to a glare-resistant touch panel, and more particularly relates to a technique for improving the operability of the touch panel under relative high temperature conditions.

2. Description of the Prior Art

A typical touch panel is constructed of an ultrathin glass plate (base sheet member) and a flexible transparent resin film (top sheet member) that are set facing each other and have resistive membranes respectively on their opposed surfaces, with spacers being placed in between the two sheet members in order to provide a certain spacing.

With the increasing range of uses for such touch panels, the demand for products that deliver new additional values is growing in recent years. For instance, for combined use with a liquid crystal display (LCD) panel equipped in an outdoor use device such as a car navigation system, a glare-resistant touch panel which is coated with a film of polarizer on its surface is devised in order to keep the visibility of the display content of the LCD panel from decreasing due to irregular reflections of incident light.

The polarizer used here is generally made of a resin film. Such a polarizing resin film has a thermal expansion coefficient six to eight times that of glass which forms the base sheet member.

This large difference in thermal expansion coefficient between the top and base sheet members causes the following problems. As the temperature rises, the whole top sheet member including the polarizer bulges outward, thereby seriously deforming the touch panel. Besides, the operability of the touch panel is impaired, since the space between the top and base sheet members widens and so the user has to apply a greater pressure to operate the touch panel. Given the recent trend toward larger touch panels with upsizing of LCD panels, the amount of outward bulge of the top sheet member is likely to increase. In such cases, the degradation in the touch panel's operability becomes more significant.

SUMMARY OF THE INVENTION

In view of the above problems, the present invention aims to provide a glare-resistant touch panel whose appearance and operability are not impaired due to temperature variations, despite its use of a polarizing film in a top sheet member.

The stated object can be fulfilled by a resistive-membrane touch panel including: a first sheet member having a first resistive membrane on one of main surfaces thereof; a second sheet member having flexibility and having a second resistive membrane on one of main surfaces thereof, the second sheet member being opposed to the first sheet member with a spacer interposed in between in such a manner that the first resistive membrane and the second resistive membrane face each other with a uniform spacing therebetween; and a third sheet member being laminated on the outer main surface of the second sheet member, wherein the second sheet member has a polarizing property, and the third sheet member has a lower thermal expansion coefficient than the second sheet member.

With this construction, resistance to glare is ensured by means of the second sheet member that has a polarizing property. Accordingly, when the touch panel is mounted on the front of a display panel such as an LCD panel, the visibility of the content displayed on the display panel is improved. Also, even when the second sheet member is extending to bulge outward as the temperature rises, the third sheet member with a lower thermal expansion coefficient serves to suppress such an outward bulge of the second sheet member, so that the distance between the first and second sheet members will not widen substantially. As a result, the appearance and operability of the touch panel can be maintained regardless of temperature variations.

Here, the second sheet member and the third sheet member may be adhered with a stress relieving adhesive. The adhesive layer formed as such can absorb thermal stress growing between the second and third sheet members at high temperatures. Accordingly, no deviation from alignment will occur between the second and third sheet members, so that the operability of the touch panel can be ensured.

Here, the third sheet member may be coated with an acrylic resin on its surface which is to be adhered to the second sheet member. Accordingly, the adhesion of the third sheet member with the adhesive is strengthened, with it being possible to increase the durability of the touch panel.

Here, the third sheet member may be less hygroscopic than the second sheet member. With this construction, the second sheet member is kept from taking on moisture at high humidities, so that the expansion of the second sheet member due to moisture absorption can be prevented.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 4 is a table showing thicknesses and thermal expansion coefficients of materials laminated in the touch panel;

FIG. 5 is a table showing the results of experiment on the operability of the touch panel when a 1100 μm-thick glass plate is used as the base sheet member and a PET (polyethylene terephthalate) film is adhered to the top sheet member as a bulge-resistant film;

FIG. 6 is a table showing the results of experiment on the operability of the touch panel when a 1100 μm-thick glass plate is used as the base sheet member and a PET film is adhered to the top sheet member as a bulge-resistant film using a stress relieving adhesive;

FIG. 8 is a table showing the results of experiment on the operability of the touch panel when a 700 μm-thick glass plate is used as the base sheet member and a PET film is adhered to the top sheet member as a bulge-resistant film;

FIG. 9 is a table showing the results of experiment on the operability of the touch panel when a 700 μm-thick glass plate is used as the base sheet member and a PET film is adhered to the top sheet member as a bulge-resistant film using a stress relieving adhesive;

DESCRIPTION OF THE PREFERRED EMBODIMENT(S)

The following is a description on embodiments of the touch panel according to the present invention, with reference to the figures.

First Embodiment
(General Construction of a Touch Panel 100)

Figure 1:
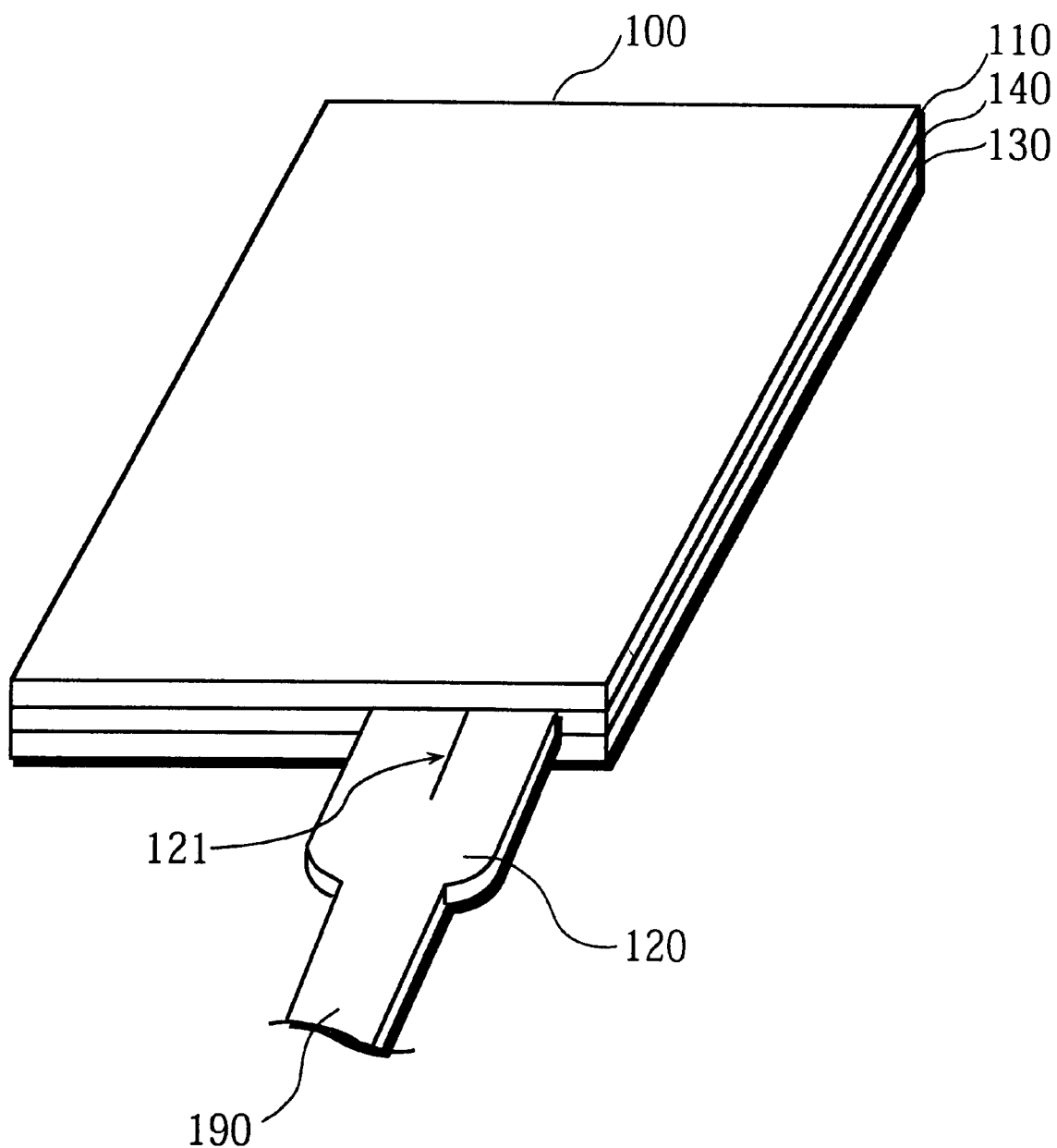
FIG. 1 is a perspective view of a touch panel according to the first embodiment of the invention.
Figure 2:
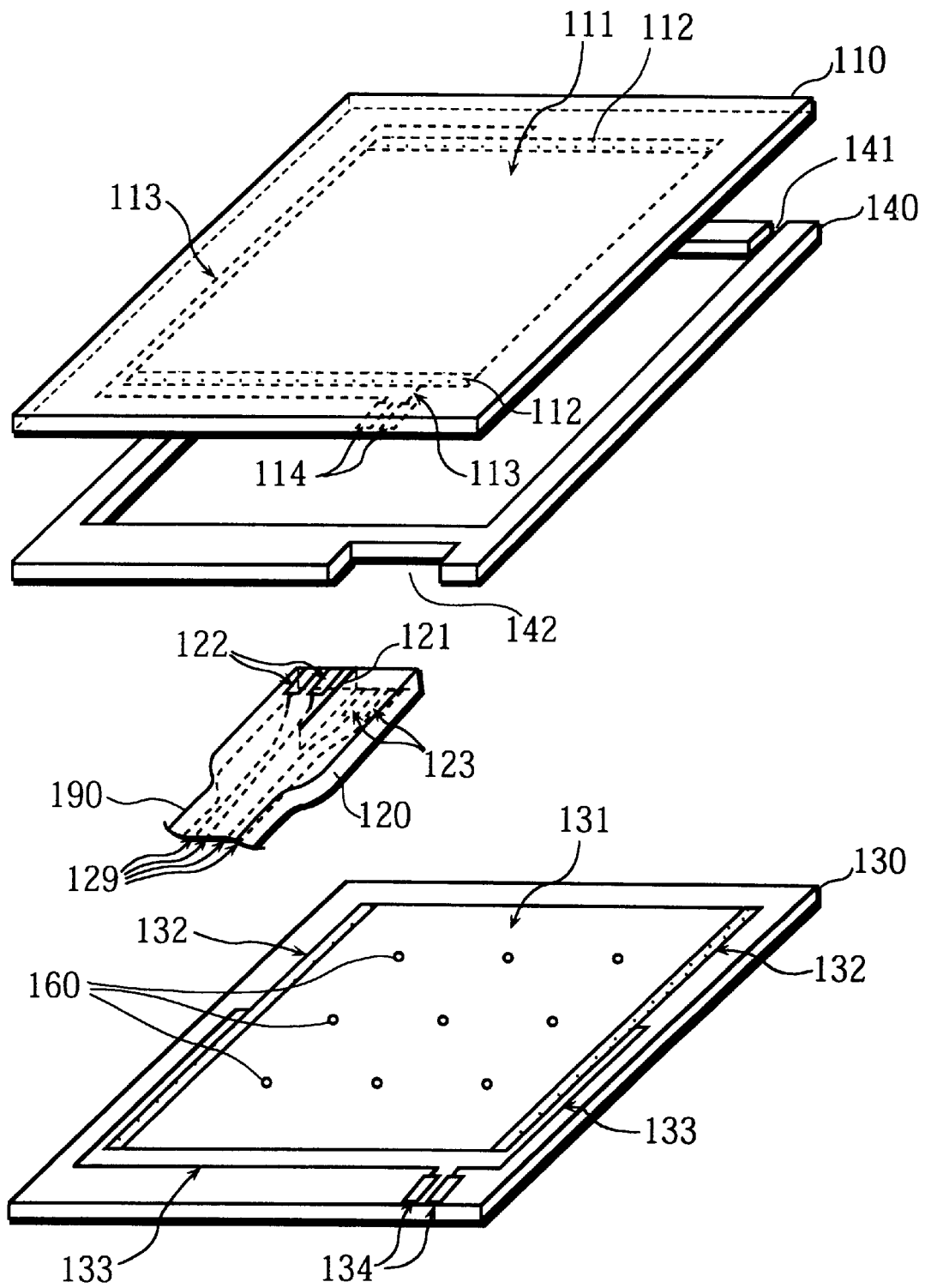
FIG. 2 is an exploded view showing the structure of the touch panel.

FIG. 1 is a perspective view of a touch panel 100 according to the first embodiment, whereas FIG. 2 is an exploded view of the touch panel 100.

In FIG. 1, the touch panel 100 is constructed by laminating a top sheet member 110 and a base sheet member 130 with a spacer 140 being placed therebetween.

The top sheet member 110 is a flexible, transparent sheet member for receiving user inputs made with a finger or an input pen, and is made up of a plurality of laminated resin films described later. Reference numeral 120 is a connector unit that is connected to inside electrodes.

In FIG. 2, the spacer 140 has a frame-like shape except for a clearance 141. The spacer 140 is made of a PET film or the like. An adhesive is applied to both upper and lower sides of the spacer 140, and the top sheet member 110 and the base sheet member 130 are bonded with the spacer 140 along their edges. Here, the clearance 141 serves to release air from inside the touch panel 100. As the ambient temperature changes, air trapped between the top sheet member 110 and the base sheet member 130 expands and contracts. The clearance 141 allows such air to flow to outside, as a result of which the internal pressure is kept equal to the external pressure. Accordingly, there will be no degradation in operability caused by the internal pressure rising against the external pressure due to the thermal expansion of the inside air. The larger the size of the touch panel 100, the larger the volume of the space between the top sheet member 110 and the base sheet member 130 becomes, which means the greater amount of air flows through the clearance 141 as the temperature changes. In such a case, it may be necessary to increase the number of clearances such as the clearance 141 to maintain the operability of the touch panel.

In the case of FIG. 2, in addition to the clearance 141 there is one more clearance similar to the clearance 141 (not shown) at the hindmost corner of the spacer 140.

Note that the spacer 140 has a recessed part 142 into which the connector unit 120 is to be inserted.

Dot spacers 160 are provided at a certain interval between the base sheet member 130 and the top sheet member 110 inside the inner edges of the spacer 140. Together with the frame-like spacer 140, the dot spacers 160 serve to keep the distance between the opposed surfaces of the top sheet member 110 and base sheet member 130 uniformly at around 100 μm.

A resistive membrane 111 made of ITO (indium tin oxide) is formed almost throughout the lower surface of the top sheet member 110 by a sputtering technique. A pair of electrodes 112 are disposed on two opposite sides of the resistive membrane 111. Also, a pair of electrode terminals 114 to be coupled to a pair of connector electrodes 122 equipped on the connector unit 120 are located on part of the lower surface of the top sheet member 110 which is not covered with the resistive membrane 111 and which meets the connector unit 120. The pair of electrode terminals 114 and the pair of electrodes 112 are connected via a pair of wiring patterns 113.

The base sheet member 130 is made of ultrathin glass. Like the top sheet member 110, a resistive membrane 131 made of ITO is formed almost throughout the upper surface of the base sheet member 130 by the sputtering technique. A pair of electrodes 132 are disposed on two opposite sides, that are perpendicular to the direction of the pair of electrodes 112, of the resistive membrane 131. Also, a pair of electrode terminals 134 to be coupled to a pair of connector electrodes 123 equipped on the connector unit 120 are located on part of the upper surface of the base sheet member 130 which is not covered with the resistive membrane 131 and which meets the connector unit 120. The pair of electrode terminals 134 and the pair of electrodes 132 are connected via a pair of wiring patterns 133.

The connector unit 120 is one end of a connecting cable 190 which is made by forming four wiring patterns 129 on a resin film of PET or polyimide using a paste made of silver or the like and sandwiching them with another resin film of the same type. On the upper and lower surfaces of this connector unit 120 are respectively exposed the ends of the four wiring patterns 129 in pairs, so as to form the pair of connector electrodes 122 and the pair of connector electrodes 123.

The reason that the four wiring patterns and the four connector electrodes are not separated but combined in a single connector unit is to save both materials cost and man-hours needed for manufacturing.

In the completely assembled touch panel 100, the pair of connector electrodes 122 and the pair of connector electrodes 123 are respectively bonded to the pair of electrode terminals 114 of the top sheet member 110 and the pair of electrode terminals 134 of the base sheet member 130. This bonding of a connector electrode and an electrode terminal is carried out by first coating the bonding area with a mixed silver-carbon conductive paste which is the common material of the wiring patterns, and then applying thermocompression bonding from both sides thereof.

Also, an incision 121 is formed between the pair of connector electrodes 122 and the pair of connector electrodes 123 in the connector unit 120, in order to relieve stress induced by the difference in thermal expansion coefficient between the top sheet member 110 and the base sheet member 130. That is to say, even when the top sheet member 110 and the base sheet member 130 expand by differing degrees as the temperature rises, stress acting on the connector unit 120 due to the difference in expansion can be absorbed by means of the incision 121. Hence, in this part of the touch panel 100 poor contact and break hardly occur over a wide range of temperatures.

(Laminated Structure of the Touch Panel 100)

Figure 3:
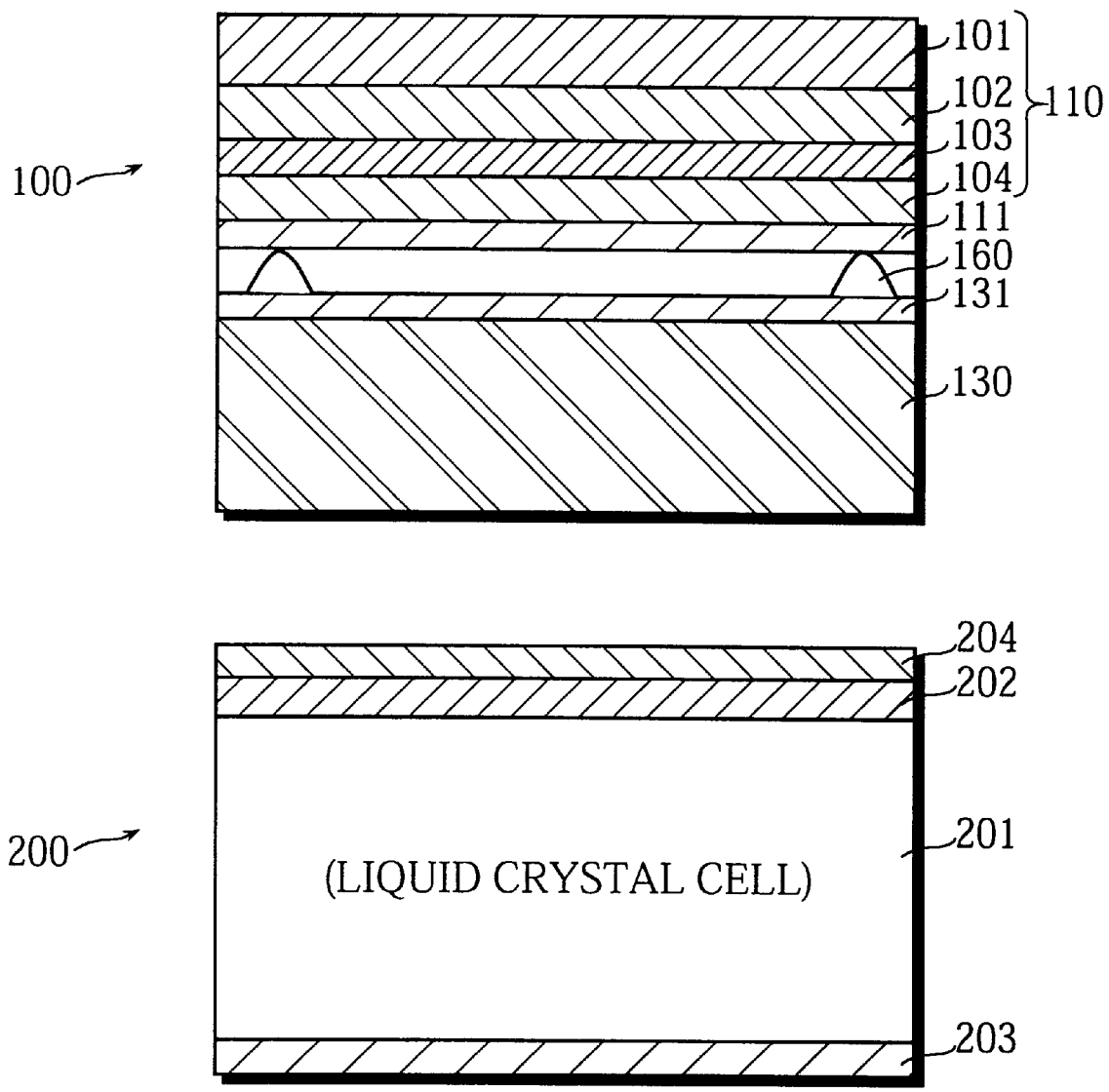
FIG. 3 is a partly enlarged sectional view showing the laminated structure of the touch panel.

FIG. 3 is a partial expanded sectional view showing the laminated structure of the touch panel 100. For convenience in explanation, the laminated structure of an LCD panel 200 on which the touch panel 100 is mounted is also shown.

In the figure, the top sheet member 110 is made by laminating a PET film 101, a polarizing film 102, a ¼λ retardation film (quarter wavelength plate) 103, and a light isotropic film 104 in this order from its upper surface thereof, through the use of an adhesive (not shown). The resistive membrane 111 is formed on the lower surface of the bottommost light isotropic film 104.

The top sheet member 110 is opposed to the base sheet member 130 with the dot spacers 160 being placed in between. The resistance membrane 131 is formed on the opposed surface of the base sheet member 130.

FIG. 4 shows table 1 which presents thicknesses and thermal expansion coefficients of the materials laminated in the touch panel 100.

The polarizing film 102 used here is made by sandwiching a PVA (polyvinyl alcohol) film, which has been drawn so as to be rendered double refractive, between TAC (triacetylacetate) films using an adhesive. In this embodiment, the thickness of the PVA film is 20 $\mu$m and the thickness of the two TAC films is 160 $\mu$m. Since the thin PVA film expands with the thick TAC films, the thermal expansion coefficient of the overall.polaring film 102 is approximately equal to that of the TAC films ($5.4 \times 10^{-5}$ cm/cm/° C.).

The ¼λ retardation film 103 is made from a PC (polycarbonate) film.

The light isotropic film 104 is a resin film that exhibits no polarization against light incident thereupon. In this embodiment, a norbornene transparent thermoplastic resin having an aliphatic ring structure, for example, ARTON film manufactured by JSR Corporation (ARTON is a trademark of the company), is used as the light isotropic film 104. The ARTON film, for its excellent transparency, surface hardness, and heat resistance, lends itself to use for touch panels.

Directly underneath the touch panel 100 is installed the transparent LCD panel 200. This LCD panel 200 has a well known construction made up of a pair of polarizing films 202 and 203 and a liquid crystal cell 201 interposed therebetween. A ¼λ retardation film 204 is laminated on the upper surface of the polarizing film 202.

Also, a backlight source (not shown) is located underneath the LCD panel 200.

The ¼λ retardation film 204 is not necessarily laminated on the upper surface of the LCD panel 200 but may be adhered to the lower surface of the base sheet member 130 in the touch panel 100. As long as the ¼λ retardation film 204 is positioned between the base sheet member 130 and the LCD panel 200, the following improvements in visibility of the content displayed on the LCD panel 200 can be attained.

Effects produced by the polarizing film 102 and the ¼λ retardation films 103 and 204 are explained below.

The polarizing film 102 is set so that its polarizing axis is parallel to the polarizing axis of the polarizing film 202 in the LCD panel 200. Meanwhile, the ¼λ retardation film 103 is set so that its optical axis forms an angle of 45° with the polarizing axis of the polarizing film 102.

Extraneous light incident through the PET film 101 is converted into linearly polarized light by the polarizing film 102 and further converted into circularly polarized light by the ¼λ retardation film 103. The circularly polarized light is reflected partly off the upper surfaces of the base sheet member (glass) 130, LCD panel 200, and/or resistive membranes 111 and 131 and as a result reenters the ¼λ retardation film 103 where it is changed to linearly polarized light. Here, since the light was phase shifted by 90° when reflected, the plane of this linearly polarized light has been rotated 90° with respect to the plane of the linearly polarized light which was emitted from the polarizing film 102.

Therefore, the linearly polarized light, having emerged from the ¼λ retardation film 103, cannot pass through the polarizing film 102 and go up any further.

Thus, when extraneous light enters the touch panel 100 and is reflected off inside the touch panel 100, the reflected light will not leave the touch panel 100. Accordingly, outdoors the user can get a clear view of the content displayed on the LCD panel 200 without suffering from glare.

The ¼λ retardation film 204 attached to the upper surface of the LCD panel 200 is set so that its optical axis forms an angle of 45° with the polarizing axis of the polarizing film 202. Here, the orientation of the optical axis of the ¼λ retardation film 204 is such that the rotation direction of circularly polarized light of the backlight source after passing through the ¼λ retardation film 204 is the reverse of the rotation direction of circularly polarized light of incident light after passing through the ¼λ retardation film 103.

With this arrangement, light from the backlight source which is linearly polarized light having passed through the polarizing film 202 is converted into circularly polarized light by the ¼λ retardation film 204. This circularly polarized light is changed again into linearly polarized light when passing through the ¼λ retardation film 103. Here, since the retardation axes of the ¼λ retardation film 103 and the ¼λ retardation film 204 are set perpendicular to each other, the plane of the linearly polarized light having emerged from the ¼λ retardation film 103 recovers the original orientation, that is, the plane of the linearly polarized light is parallel to the plane of the linearly polarized light immediately after passing through the polarizing film 202. Also, since the polarizing axes of the polarizing film 102 and the polarizing film 202 are set parallel to each other, the plane of the linearly polarized light of the backlight source having traveled through the ¼λ retardation film 103 is parallel to the polarizing axis of the polarizing film 102, so that this linearly polarized light can pass through the polarizing film 102 as it is. Thus, light from the backlight source can be emitted to the outside without being blocked by the polarizing film 102 and the ¼λ retardation film 103 which are disposed to guard against glare. Hence a sufficient amount of light can be obtained with no need to increase the output of the backlight source, which benefits high visibility.

As is clear from table 1, the thermal expansion coefficient of each of the polarizing film 102, the ¼λ retardation film 103, and the light isotropic film 104 is about eight to nine times that of the glass which forms the base sheet member 130. Accordingly, as the temperature rises, these films of the top sheet member 110 expand by greater amounts than the glass.

As noted above, the top sheet member 110 and the base sheet member 130 are securely fixed to each other at their edges via the spacer 140. As such, the thermal expansion of the top sheet member 110 goes upward and thereby causes the aforementioned upward bulge, which impairs the appearance and operability of the touch panel 100.

According to this embodiment, the PET film 101 the thermal expansion coefficient of which is lower than the polarizing film 102 or the light isotropic film 104 is placed on the top of the top sheet member 110, so that such an upward bulge can be effectively suppressed.

Here, if the PET film 101 is extremely thin, it cannot endure the thermal expansion of the lower films and will end up expanding itself. Therefore, the PET film 101 needs to have a certain thickness. On the other hand, if the PET film 101 is too thick, it cannot exhibit enough flexibility and so undermines the operability of the touch panel 100.

Accordingly, the PET film 101 is preferably 50 μm~250 μm in thickness. More preferably, the PET film 101 is 125 μm~188 μm in thickness, so as to completely suppress the bulge of the top sheet member 1110 and maintain desired operability over a wider range of temperatures. In the present embodiment, the thickness of the PET film 101 is set at 188 μm, as shown in table 1 in FIG. 4.

The TAC films used in the polarizing film 102 are hygroscopic and have an extremely high hygroscopic linear expansion coefficient (i.e. an expansion coefficient due to moisture absorption) of $4 \times 10^{-5} \sim 7 \times 10^{-5}$ cm/cm/%. Accordingly, the expansion of the polarizing film 102 tends to further increase if the temperature and the humidity both rise. In this embodiment, however, the upper surface of the polarizing film 102 is covered by the PET film 101 that has little hygroscopicity, so as to keep the polarizing film 102 from contact with outside air. In so doing, the touch panel 100 will not be adversely affected by a change in outside humidity.

(Experimental Results)

Table 2 in FIG. 5 shows experimental results which demonstrate that the bulge of the top sheet member 110 was mostly suppressed by adhering the PET film 101 thereto.

The materials and thicknesses of respective members of a touch panel employed in this experiment are as shown in table 1, and the size of the touch panel 100 is 190 mm×150 mm (8.4 inches).

The experiment was conducted in the following setting. When the temperature was −20° C. or 70° C., the atmosphere was set to be dry with almost no humidity, whereas when the temperature was 25° C., 40° C., or 60° C., the atmosphere was set to be damp with a high humidity of 90%. For each of these atmospheric conditions, the maximum amount of bulge of the touch panel was measured in case ① where the touch panel was left in the atmosphere for 24 hours and in case ② where after being left in the atmosphere for 24 hours the touch panel was removed from the atmosphere and left in a normal atmosphere (about 25° C. in temperature and 50% in humidity) for 30~60 minutes.

Here, the amount of bulge was measured in millimeters as a displacement of a point where the largest bulge occurred from a reference plane. The reference plane used here is the upper surface of the top sheet member 110 under the normal temperature and humidity.

In addition to the above bulge test, the operability of the touch panel was evaluated by imposing various operating weights onto the touch panel with an ordinary input pen (made of polyacetal, 0.8 mm in pen tip radius). This operability test was repeated for ten sample touch panels that had been put under the same atmospheric condition among the above atmospheric conditions in case ① and case ②. If all ten samples operated when pressed with a certain operating weight by the input pen, the operability was rated as "○". If any one of the ten samples did not operate with the operating weight, the operability was rated as "Δ". If none of the ten samples operated with the operating weight, the operability was rated as "×".

Needless to say, if all ten samples operate with a small operating weight, it demonstrates high operability. As a matter of practicality, it is desirable if all ten samples can operate with an operating weight no larger than 100 g~130 g after the ambient temperature is changed to normal. In contrast, if some samples cannot operate with an operating weight as high as 200 g, it indicates poor operability and low product quality.

As shown in table 2, satisfactory results were obtained in case ①, as the touch panel was rated as "○" for an operating weight of 80 g in all atmospheres other than −20° C. These results were unchanged even when the touch panel was left for another 240 hours.

In case ②, the touch panel showed high operability for atmospheres of 25° C. and 40° C. that are within a range of normal usage environments, as the amount of bulge was measured 0 mm and the operability was rated as "○" for the operating weight 80 g. For atmospheres of 60° C. and 70° C., some samples did not operate with an operating weight of 130 g, but all ten samples operated with an operating weight of 200 g.

Compare this touch panel with a conventional touch panel to which the PET film 101 is not adhered. When left standing in an ambient temperature of 40° C. (90% in humidity) for 24 hours, the conventional touch panel bulged by 2.5 mm and became seriously deformed. Besides, the operability of the conventional touch panel is poor, as most samples did not operate until an operating weight of 200 g or larger was imposed thereon. This demonstrates the substantially improved operability of the touch panel in the present embodiment.

Second Embodiment

According to the second embodiment, the touch panel 100 can maintain high operability even after removed from a hostile environment with a temperature as high as 60° C.

As described above, the touch panel 100 used in table 2 was rated as "○" for the operating weight 80 g in both case ① and case ② in the ambient temperatures 25° C. and 40° C., which is a notable improvement from the conventional touch panel without the PET film 101. However, when the ambient temperature changed from 60° C. and 70° C. to normal, the operability was not particularly high, as it was rated as "○" only with the, operating weight 200 g.

Suppose this touch panel 100 is employed in a product such as a car navigation system. The ambient temperature inside a car parked under the hot sun in midsummer often reaches as high as 60° C., so that it is desirable to maintain high operability even after the touch panel 100 is left in such a hostile condition.

In table 2, high operability was maintained while the ambient temperature was 60° C. or 70° C., but the operability decreased once the ambient temperature returned to normal. A probable cause of this is given below.

In the first embodiment, the PET film 101 with a low thermal expansion coefficient is adhered to the upper surface of the polarizing film 102, so as to suppress the thermal expansion of the polarizing film 102 induced by a rise in temperature and keep the polarizing film 102 from bulging upward. This being so, while the touch panel 100 is left standing in an ambient temperature of 60° C. or higher for a long time, thermal stress acting between the PET film 101 and the polarizing film 102 grows and eventually "deviation" appears in the adhesive layer between the two films in such a direction that would relieve the thermal stress. Then, once the ambient temperature has changed to normal, the polarizing film 102 with a higher thermal expansion coefficient contracts by a greater extent than the PET film 101 while the deviation remains, as a result of which the PET film 101 becomes slack and bulges upward. This explains the bulge of 1 mm in case ② shown in table 2.

Thus, once the ambient temperature has dropped to normal after long hours, the operability of the touch panel 100 deteriorates. It is, however, more preferable if the touch panel 100 can maintain high operability even when removed after being left at a high temperature such as 60° C.

The solution of this problem lies in a material of an adhesive which is used to bond the PET film 101 and the polarizing film 102. Instead of an ordinary adhesive conventionally used for resin films, the second embodiment employs an adhesive that will remain elastic even after being dried, in order to have the adhesive layer absorb thermal stress which acts between the PET film 101 and the polarizing film 102 under a high temperature and thereby alleviate the thermal stress. The same experiment as table 2 was conducted on a touch panel that is identical to the touch panel of the first embodiment apart from the application of this adhesive having stress relieving ability (hereinafter, "stress relieving adhesive"). The results of the experiment are shown in table 3 in FIG. 6.

In table 3, although no improvement in operability was seen when the ambient temperature changed from the highest 70° C. to normal, the operability improved when the ambient temperature changed from 60° C. to normal, as no bulge was observed and the operability was rated as "○" with the operating weight 80 g.

Thus, through the use of the stress relieving adhesive to adhere the PET film 101 to the polarizing film 102, it is possible to relieve thermal stress between the two films in an atmospheric condition around 60° C. which could happen in actual use. Once the ambient temperature has returned to normal, the elastic force of the adhesive serves to resolve deviation temporarily occurring between the two films, so that the two films are brought back into proper alignment. Hence the bulge of the touch panel is suppressed and the operability is substantially increased.

Here, before adhering the PET film 101 to the polarizing film 102 using the stress relieving adhesive, it is preferable to apply a surface treatment to the adhered surface of the PET film 101.

In general, a PET film and an adhesive made of a stress relieving material do not have sufficient adhesion, and might come off from each other under sudden temperature changes (especially in high temperatures). Therefore, it is necessary to apply a surface treatment to at least the adhered surface of the PET film 101 to strengthen the adhesion with the adhesive.

As the surface treatment, a well-known treatment such as corona treatment or ozone ultraviolet irradiation treatment may be applied, but these treatments are difficult in establishing stable work conditions in their treatment processes. For reliability and manufacturability, it is preferable to coat the surface of the PET film 101 with a material that has strong adhesion with the stress relieving adhesive.

As an example, an acrylic resin is used as such a coating material. The coating may be easily done according to a well known roll coating technique that makes a coating solution from the acrylic resin dissolved in a predetermined organic solvent and applies the coating solution to the surface of the PET film 101 using a roller.

Figure 7:
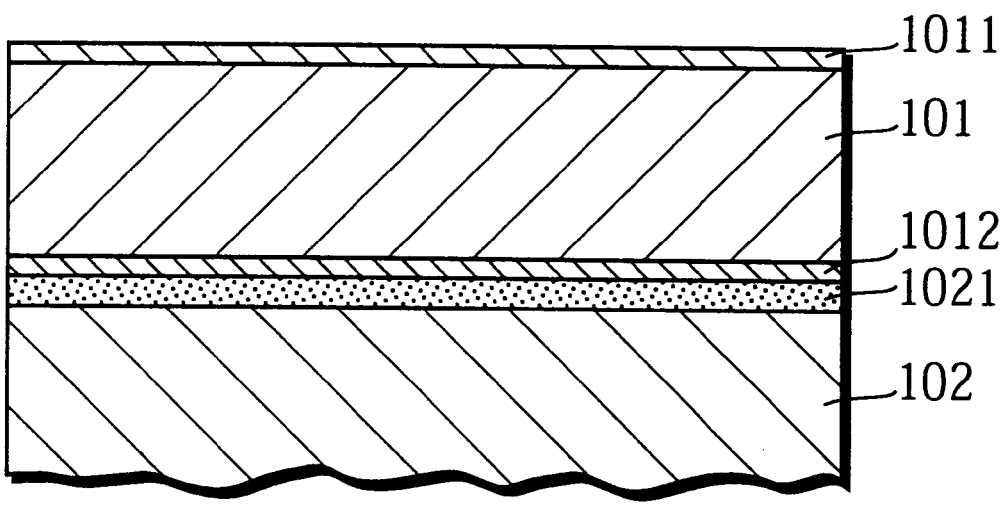
FIG. 7 is an expanded sectional view showing the contact area of a PET film and a polarizing film in a touch panel according to the second embodiment of the invention.

FIG. 7 is an expanded sectional view showing part of the top sheet member 110 where the PET film 101 is coated with the acrylic resin. In the figure, the stress relieving adhesive layer is labeled with reference numeral 1021.

In the figure, both surfaces of the PET film 101 are covered with the acrylic resin coatings beforehand, and so acrylic resin layers 1011 and 1012 each having a thickness of about 5 μm are formed. Since the acrylic resin not only has strong adherence with the stress relieving adhesive but also has excellent durability, the acrylic resin layer 1011 serves to increase resistance to abrasion cause by pen input. Usually, a thickness of around 10 μm is sufficient for such acrylic resin coatings. The coatings thicker than that would decrease the elasticity of the pressure surface of the touch panel and thereby impair its operability.

Also, resistance to glare can be further increased by applying an anti-glare treatment to the surface of the acrylic resin layer 1011. As the anti-glare treatment, a well known method such as gravure roll coating is applied. In the gravure roll coating, a predetermined coating liquid is sucked up by a gravure roll having fine depressions which have been formed on its surface by etching. After scraping excess liquid off the surface of the gravure roll using a doctor blade, the gravure roll is applied onto the acrylic resin film.

The same experiment as table 2 was conducted on a touch panel in which hard coatings had been applied to both surfaces of the PET film 101 and not only the PET film 101 and the polarizing film 102 but also the polarizing film 102 and the ¼λ retardation film 103 that differ in thermal expansion coefficient had been bonded with the stress relieving adhesive.

The results of this experiment were satisfactory in nearly all atmospheric conditions, as in the case of the experiment shown in table 3. No separation was seen between the PET film 101 and the polarizing film 102 in a temperature as high as 70° C. Also, sufficient operability was ensured even after the ambient temperature changed from 60° C. to normal.

While in the above experiments a glass plate of 1100 μm in thickness was used as the base sheet member 130, a thinner glass plate is more advantageous for weight reduction of the touch panel, especially when the touch panel is used in a portable device.

Table 4 in FIG. 8 shows the results of conducting the same experiment as table 2 on a touch panel in which the PET film 101 was adhered to the top sheet member 110 and a glass plate of 700 μm in thickness was used as the base sheet member 130. Table 5 is FIG. 9 shows the results of conducting the same experiment as table 3 on a touch panel in which the PET film 101 was adhered to the top sheet member 110 with the stress relieving adhesive and a glass plate of 700 μm in thickness was used as the base sheet member 130.

In both experiments, while the ambient temperature was −20° C., the amount of bulge was 1.5 mm and the operability was rated as "×" even with the maximum operating weight 200 g. This can be explained as follows. Since the thermal expansion coefficient of the polarizing film 102 is higher than that of the PET film 101, in an extreme low temperature the polarizing film 102 contracts by a greater extent than the PET film 101. This causes such a bending force that bulges the top sheet member 110 upward. Also, because of the thinness of the base sheet member 130 (700 μm), the base sheet member 130 is slightly deformed in the downward direction due to this bending force.

Meanwhile, the results after the ambient temperature changed to normal were the same as the experiments conducted using the glass plate of 1100 μm in thickness.

To be more specific, for the PET-adhered touch panel without the stress relieving adhesive, its operability was satisfactory except when the ambient temperature changed from 60° C. and 70° C. to normal (see table 4). For the PET-adhered touch panel with the stress relieving adhesive, its operability was satisfactory except when the ambient temperature changed from 70° C. to normal (see table 5).

These experimental results indicate that whether the base sheet member 130 is a very thin glass plate of 700 μm or a thicker glass plate of 1100 μm, the operability can be substantially improved by the application of the PET film 101 onto the polarizing film 102 with the stress relieving adhesive.

Modifications

Although the present invention has been described by way of the above embodiments, the invention should not be limited to such. For instance, the following modifications are possible.

(1) In the laminated structure shown in FIG. 3, the ¼λ retardation film 103 is placed underneath the polarizing film 102 to convert linearly polarized light into circularly polarized light, thereby ensuring visibility and resistance to glare (such a structure is hereafter referred to as "circularly polarizing structure"). However, a certain level of visibility and glare resistance can be achieved even if the touch panel 100 does not have the circularly polarizing structure, as long as it is equipped with the polarizing film 102.

Figure 10:
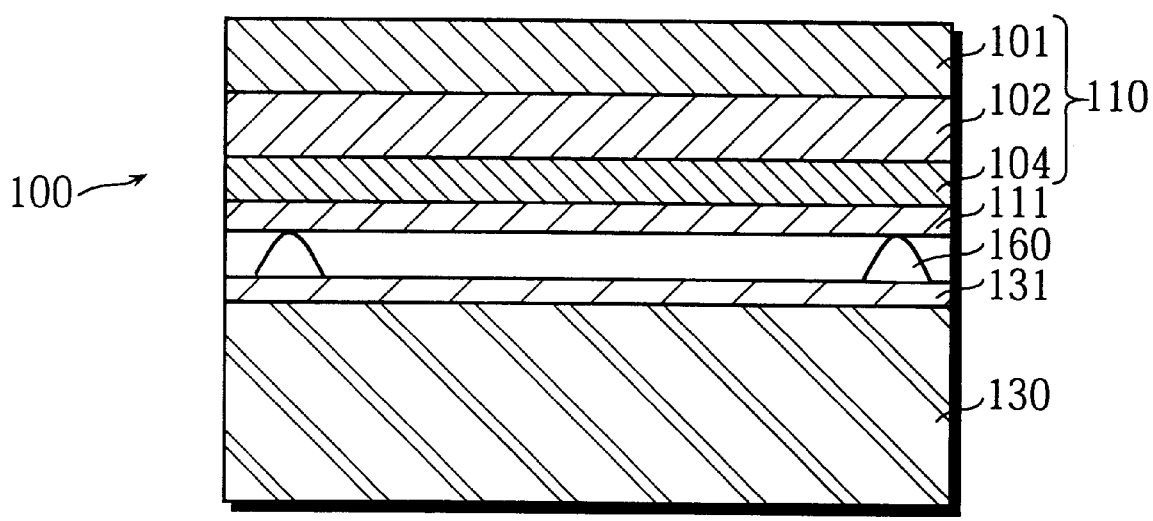
FIG. 10 is a partly enlarged sectional view showing the laminated structure of a variant of the touch panel according to the invention.
Figure 10:
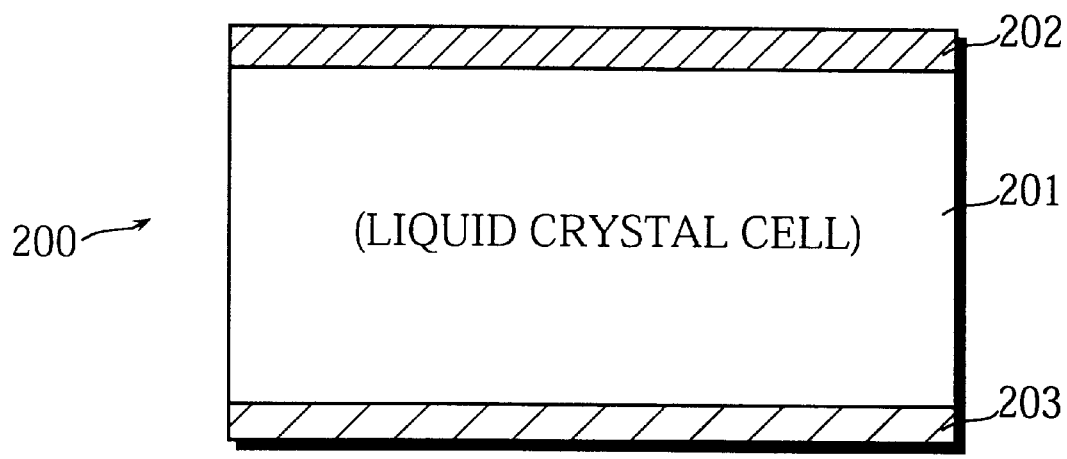

FIG. 10 is a partly enlarged sectional view showing the laminated structure of the touch panel 100 which does not include the ¼λ retardation film 103. As with FIG. 3, the laminated structure of the LCD panel 200 is also illustrated.

The top sheet member 110 is made by laminating the PET film 101, the polarizing film 102, and the light isotropic film 104 through the use of an adhesive (not shown). The resistive membrane 111 is formed underneath the bottommost light isotropic film 104. The base sheet member 130 is opposed to the top sheet member 110, with the dot spacers 160 being interposed therebetween. The resistive membrane 131 is formed on the upper surface of the base sheet member 130. This structure differs with the circularly polarizing structure in FIG. 3 in that the ¼λ retardation film 103 has been omitted.

Also, the ¼λ retardation film 204 has been omitted from the LCD panel 200 underneath the touch panel 100.

In FIG. 10, the polarizing film 102 in the touch panel 100 is located so as to have its polarizing axis parallel to that of the polarizing film 202 in the LCD panel 200. Accordingly, having passed through the polarizing film 2012, light from the backlight source can pass through the polarizing film 102 as it is. Thus, the amount of light from the backlight source hardly decreases, and sufficient visibility can be ensured.

Meanwhile, the amount of extraneous light incident through the PET film 101 decreases by about ½ at the polarizing film 102, since the polarizing film 102 allows only light whose polarizing plane is parallel to the polarizing axis thereof to pass through. As a result, glare can be reduced to a practical level, though to a lesser extent than the touch panel 100 of the circularly polarizing structure.

(2) Glare-resistant film layers (such as the polarizing film 102.and the ¼λ retardation film 103, hereinafter collectively referred to as "glare-resistant film") in the top sheet member 110 of the touch panel 100 can serve their purposes as long as they are positioned within a display screen range of the LCD panel 200 on which the touch panel 100 is mounted.

Given a higher material cost of such a glare-resistant film than other resin films, it is cost advantageous if the glare-resistant film is smaller than an area surrounded by the inner edges of the spacer 140 (hereinafter, "inner edge area"). However, too small a glare-resistant film poses a danger of rendering the touch panel 100 inoperable, asia break was found between the resistive membrane 111 and the pair of electrodes 112 during the touch panel manufacturing process.

Such a break is caused as follows. Since the glare-resistant film is relatively expensive, it is preferable to apply the glare-resistant film at a later stage in the manufacturing process. Accordingly, after the light isotropic film 104 and the base sheet member 130 are laminated with the frame-like spacer 140 and the dot spacers 160 being interposed therebetween, the glare-resistant film is adhered to the upper surface of the light isotropic film 104 by pressing with a roller. Here, when the roller is pressing on part of the inner edges of the spacer 140, in the pressed part the light isotropic film 104 which is the base of the resistive membrane 111 elongates greatly as if to bend. However, the resistive membrane 111 itself is not flexible enough to endure the elongation of the light isotropic film 104, as a result of which the break occurs.

This problem can be avoided if the glare-resistant film is as large as the light isotropic film 104, as the strength of the light isotropic film 104 increases in an area corresponding to the inner edges of the spacer 140 and so the light isotropic film 104 will not elongate so much when pressed by the roller. As noted above, however, this is not particularly desirable in terms of cost. To minimize the size of the glare-resistant film for cost reduction with no danger for breaks, the 'size of the glare-resistant film may be set slightly larger than the inner edge area of the spacer 140.

Figure 11A:
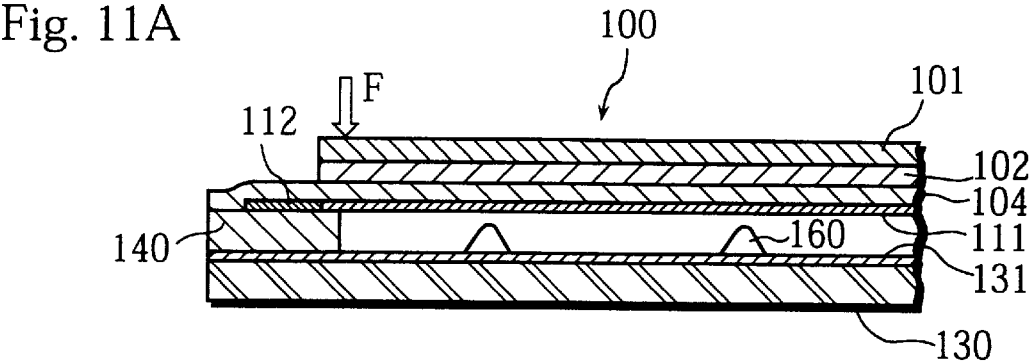
FIG. 11A is a partial longitudinal sectional view of a variant of the touch panel according to the invention.
Figure 11B:
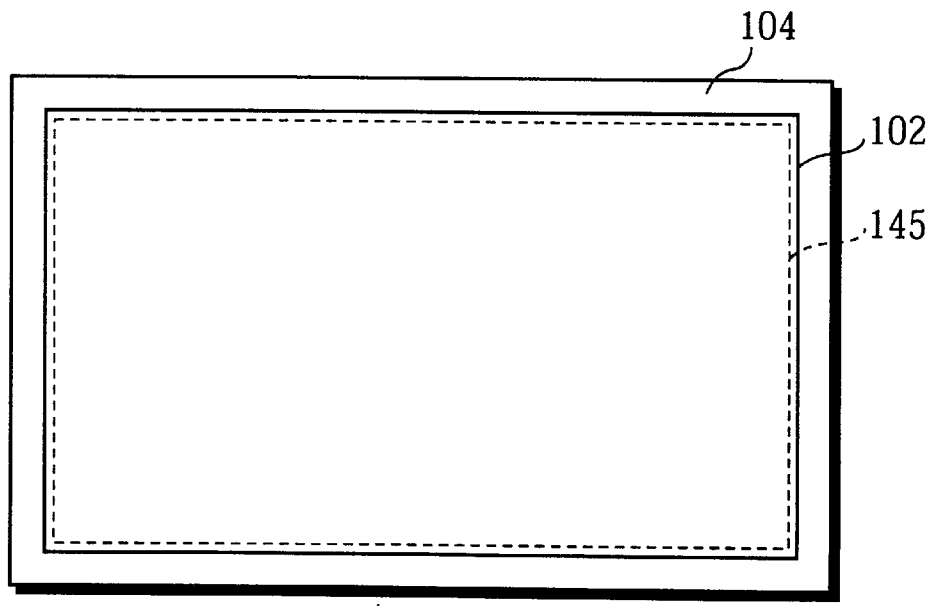
FIG. 11B is a plan view showing the size difference between a resistive membrane base (light isotropic film) and a polarizing film and the position of the inner edges of a frame-like spacer in the touch panel shown in FIG. 11A.

FIG. 11A is a partial longitudinal sectional view showing the laminated structure of the touch panel 100 that is equipped with the polarizing film 102 as an only glare-resistant film. Note that the ¼λ retardation film 103 has been omitted for simplicity's sake. On the lower surface of the light isotropic film 104 the resistive membrane 111 is laminated that is coupled to an electrode 112. On the upper surface of the light isotropic film 104 the polarizing film 102 is laminated!the edge of which slightly extends beyond the inner edge of the spacer 140. FIG. 11B shows the size difference between the light isotropic film 104 and the polarizing film 102 shown in FIG. 11A, where a broken line 145 indicates the inner edges of the spacer 140. As shown in the figure, the polarizing film 102 is smaller than the light isotropic film 104 but is slightly larger than the inner edge area of the spacer 140. In the present example, the edges of the polarizing film 102 are situated so as to extend 1 mm beyond the inner edges of the spacer 140. With this arrangement, no break was found during the manufacturing process.

Normally, the inner edges of the spacer 140 are unlikely to be pressed for locator input in a device equipped with the touch panel 100. Still, should a large pressure be applied with an input pen onto part of the inner edges as designated by arrow F in FIG. 11A, breaks can be prevented according to the above modification.

In FIG. 11B, all edges of the polarizing film 102 are set to extend beyond the inner edges of the spacer 140. However, while there is a serious danger of malfunction if a break occurs on any of the two sides of the resistive membrane 111 which are connected to the pair of electrodes 112, a malfunction is unlikely when a break occurs on any of the two sides of the resistive membrane 111 which are not connected to each electrode 112. Therefore, it is sufficient if the edges of the glare-resistant film extend beyond the inner edges of the spacer 140 at least on the two sides where the pair of electrodes 112 are located.

With this construction, breaks can be efficiently suppressed without a substantial increase in materials cost.

Figure 12:
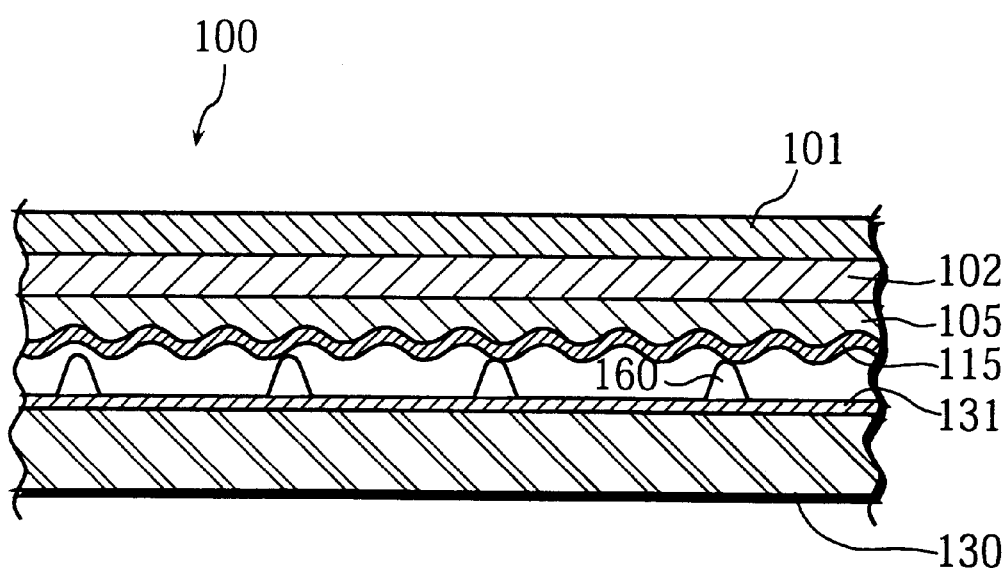
FIG. 12 is a partial longitudinal sectional view showing the laminated structure of a variant of the touch panel according to the invention.

(3) When the surface of the touch panel 100 is pressed, the distance between the resistance membranes 111 and 131 changes around the pressed portion. When this happens, among extraneous light entering the touch panel 100, light reflected off the resistive membrane 111 and light reflected off the resistive membrane 131 interfere with each other, which induces Newton's rings and impairs the viewability of the display screen. To guard against such unpleasant Newton's rings, the touch panel 100 may be modified in the following manner. FIG. 12 is a partial longitudinal sectional view showing the laminated structure of the modified touch panel 100. For simplicity's sake, this touch panel 100 includes only one glare-resistant film, i.e. the polarizing film 102, as in FIG. 11A.

In the figure, a light isotropic film 105 having many small depressions on its lower surface is used as the base of a resistive membrane 115. As a result, similar depressions are formed on the surfaces of the resistive membrane 115. This being so, extraneous light incident on this resistive membrane 115 is irregularly reflected, so that almost no light interferes with light reflected off the resistive membrane 131. As a result, Newton's rings are effectively suppressed.

Here, the surface of the base (glass plate 130) of the resistive membrane 131 may be made rough instead of the base of the resistive membrane 115, or the surfaces of both bases may be made rough. Preferably, such rough surfaces have a surface roughness Ra of around 0.06 $\mu$m~3.0 $\mu$m according to JIS and ISO468-1982.

To form a rough surface on a resistive membrane base, a well known technique is used.

For a resistive membrane base such as the light isotropic film 104 made of a resin, mainly the aforementioned anti-glare treatment is applied. For a resistive membrane base such as the base sheet member 130 made of glass, on the other hand, mainly the etching is applied where the surface of the glass plate is chemically made rough using a medicine such as fluorine.

With this modification, however, there is a possibility that projections on one resistive membrane become, so close to the other resistive membrane as to come into contact even when there is no pressure applied, thereby causing a malfunction. To avoid this, it is necessary to make the height of the dot spacers 160 greater than that of the projections.

(4) While in the above embodiments a PET film is used as the bulge-resistant film for its lower thermal expansion coefficient than that of the polarizing film 102, a film made of other material may instead be used as long as its thermal expansion coefficient is lower than that of the polarizing film 102. Here, if the polarizing film 102 is mainly made of a material with a high hygroscopic linear expansion coefficient such as a TAC film, it is preferable to at least use a film with a lower hygroscopicity. In this respect, too, the PET film is suitable as the bulge-resistant film.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is aimed is:

1. A resistive-membrane touch panel comprising:
   a first sheet member having a first resistive membrane on one of main surfaces thereof;
   a second sheet member having a second resistive membrane on one of main surfaces thereof, the second sheet member being opposed to the first sheet member with a spacer interposed in between in such a manner that the first resistive membrane and the second resistive membrane face each other with a uniform spacing therebetween; and
   a third sheet member being laminated on the outer main surface of the second sheet member,
   wherein the second sheet member has a polarizing property, and the third sheet member has a lower thermal expansion coefficient than the second sheet member.

2. The resistive-membrane touch panel of claim 1, wherein the third sheet member is adhered to the outer main surface of the second sheet member using an adhesive which has a stress relieving ability.

3. The resistive-membrane touch panel of claim 2, wherein the third sheet member is coated with an acrylic resin on one of main surfaces thereof which is adhered to the outer main surface of the second sheet member.

4. The resistive-membrane touch panel of claim 1, wherein the third sheet member is less hygroscopic than the second sheet member.

5. The resistive-membrane touch panel of claim 1, wherein the second sheet member is made by laminating at least two films including a polarizer.

6. The resistive-membrane touch panel of claim 5, wherein a first quarter wavelength plate is placed outside the first sheet member so as to be approximately parallel to the first sheet member, and the second sheet member includes a second quarter wavelength plate which is laminated nearer to the inner main surface thereof than the polarizer.

7. The resistive-membrane touch panel of claim 6, wherein an optical axis of the first quarter wavelength plate forms an angle of 45° with a polarizing axis of the polarizer in a first direction, and an optical axis of the second quarter wavelength plate forms an angle of 45° with the polarizing axis of the polarizer in a second direction that is opposite to the first direction.

8. The resistive-membrane touch panel of claim 5, wherein the polarizer is made by sandwiching a polyvinyl alcohol film having a polarizing property between triacetylacetate films, and the third sheet member is made of a material which is less hygroscopic than the triacetylacetate films.

9. The resistive-membrane touch panel of claim 5, wherein at least part of the spacer is formed along edges of the first and second sheet members in a shape of a picture frame, and
   wherein on the inner main surface of the second sheet member are formed a pair of electrodes which are electrically connected to the second resistive membrane and are set facing each other, and a size of the polarizer is such that edges of the polarizer extend beyond inner edges of the at least part of the spacer, at least on two sides where the pair of electrodes are positioned.

10. The resistive-membrane touch panel of claim 1, wherein the third sheet member is a polyethylene terephthalate film.

11. The resistive-membrane touch panel of claim 1, wherein at least one of the first resistive membrane and the second resistive membrane has a main surface which is roughened to prevent reflections.

12. The resistive-membrane touch panel of claim 11, wherein a surface roughness Ra of the rough main surface is in a range of 0.06 $\mu$m to 3.0 $\mu$m inclusive.

13. In a heat resistant touch panel for providing signals when at least a predetermined pressure is applied to the panel; the improvement comprising:

a first sheet member having a first resistive membrane;

a second sheet member having a second resistive membrane operatively connected to the first sheet member, the first resistive membrane is positioned opposite the second resistive membrane at a predetermined spacing distance; and a third sheet member laminated to the second sheet member, the second sheet member has a polarizing property and the third sheet member has a lower thermal expansion coefficient than the second sheet member whereby a user can apply pressure to force the first and second resistive membranes to contact and provide a signal.

14. The touch panel of claim 13 wherein the third sheet member is adhered to the second sheet member with an adhesive having a stress relieving characteristic.

* * * * *